March 19, 1935.                F. A. KOLSTER                1,995,124
                             REFRIGERATING SYSTEM
                             Filed May 6, 1932          3 Sheets-Sheet 1
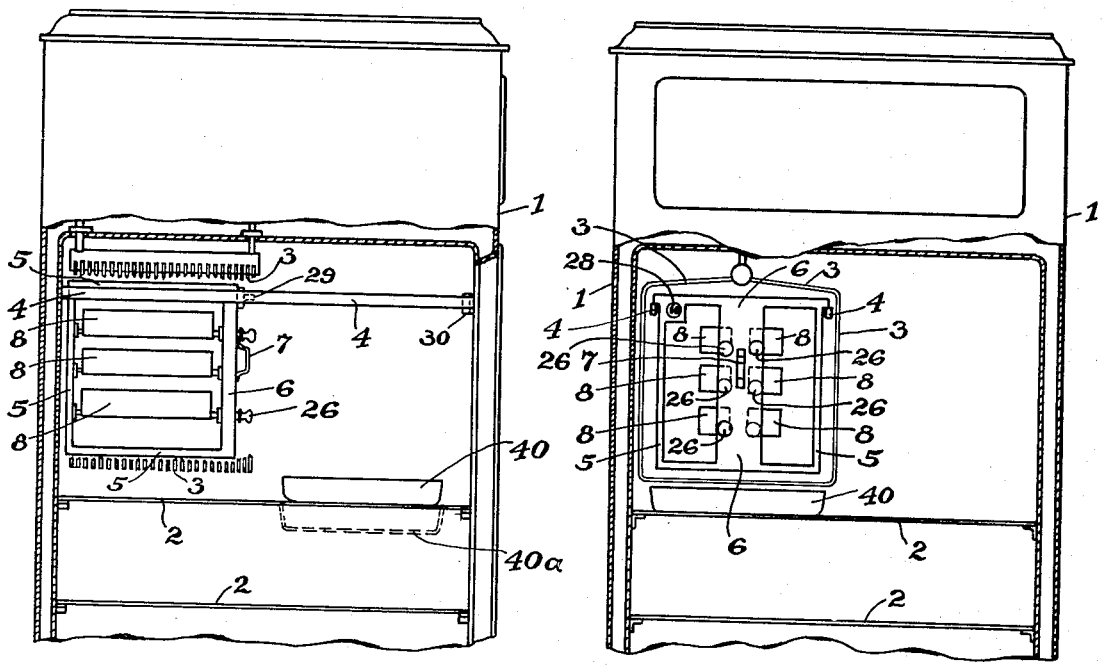
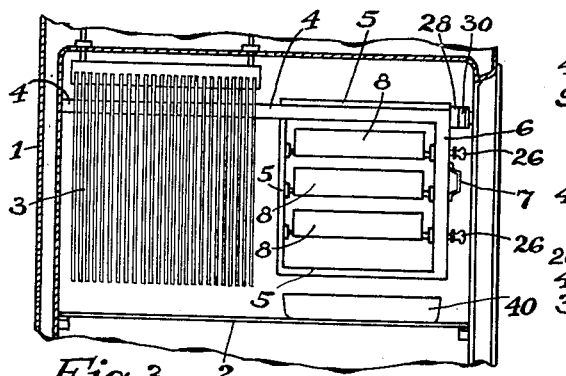
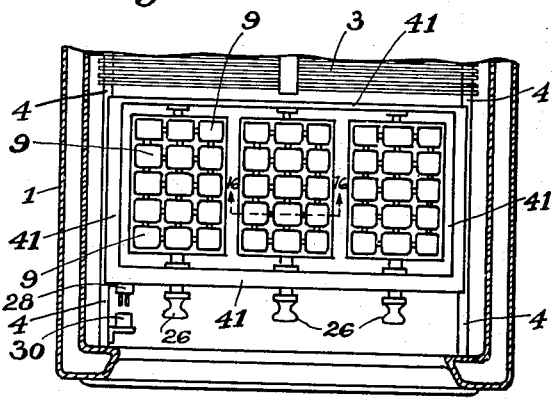
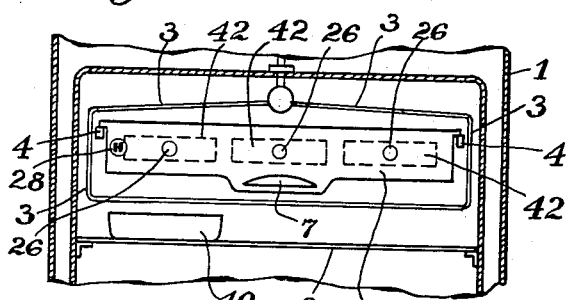
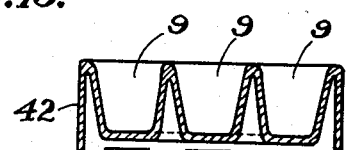
INVENTOR.
Frederick A. Kolster
BY
Cornelius D. Ehret
his ATTORNEY.

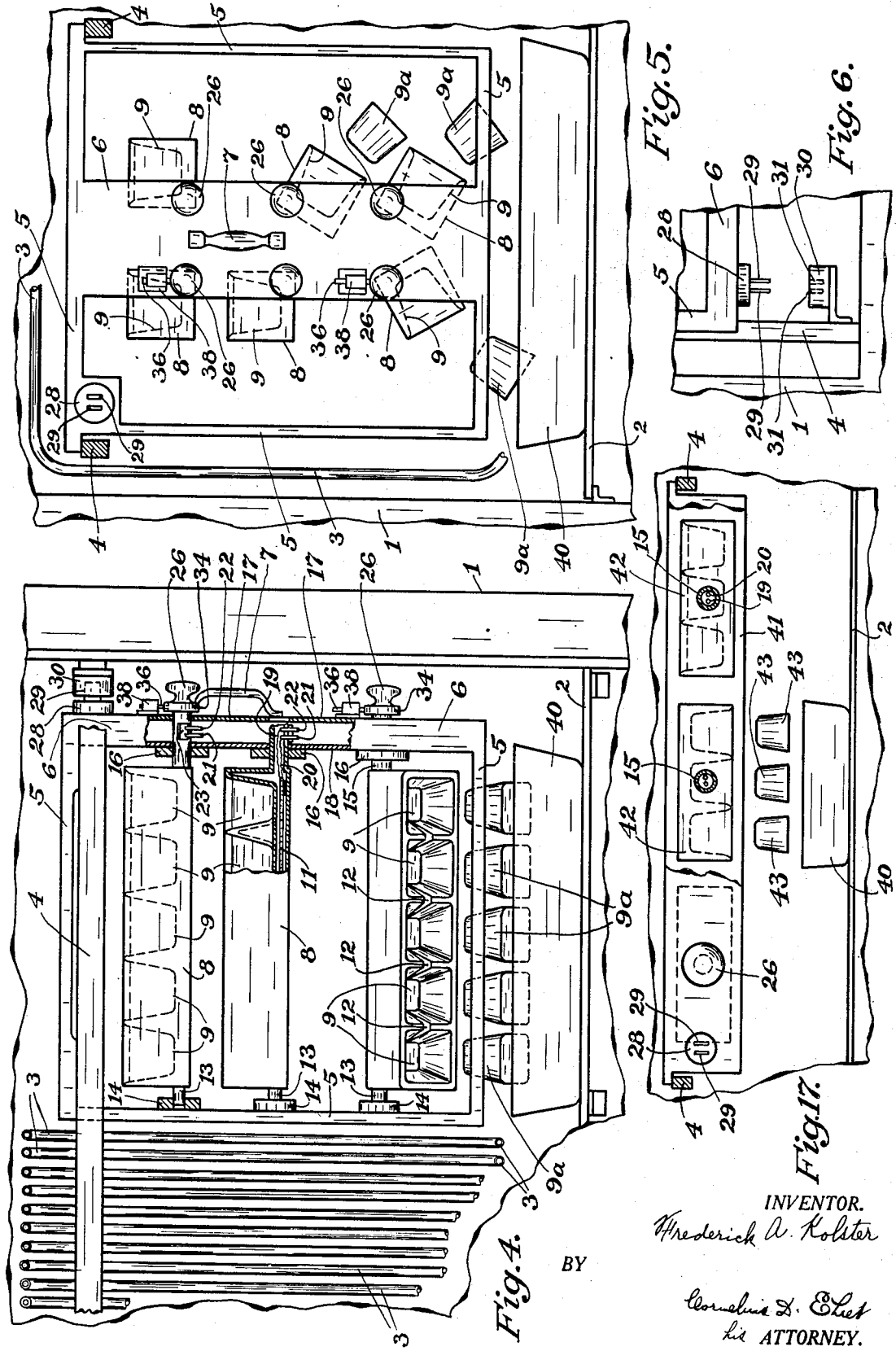

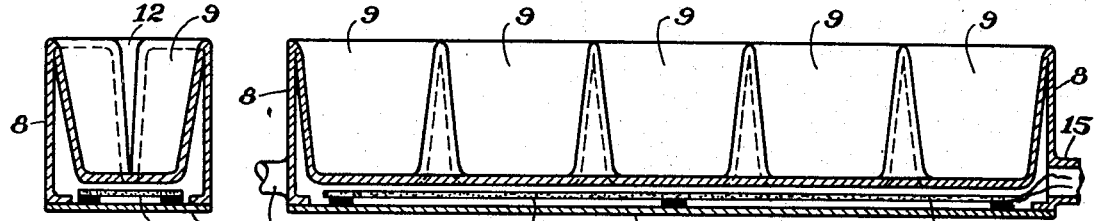
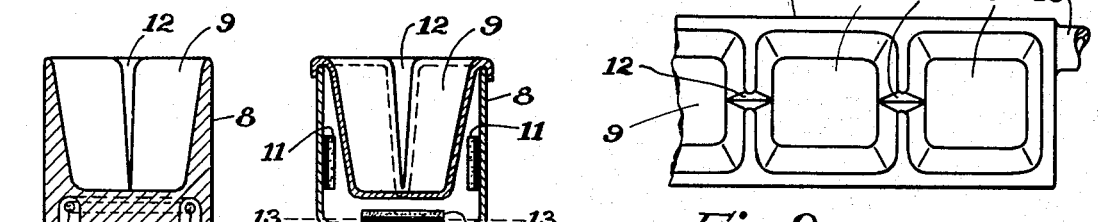
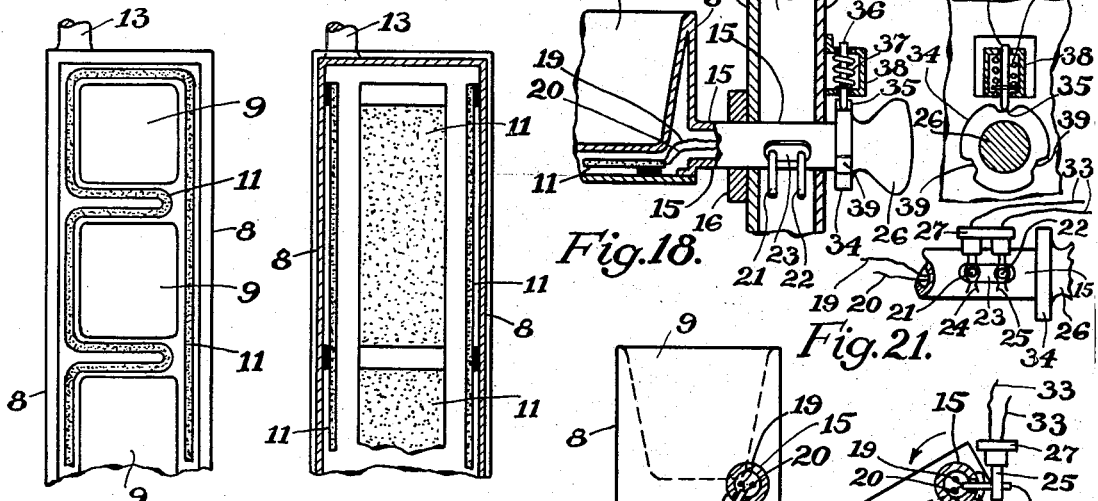
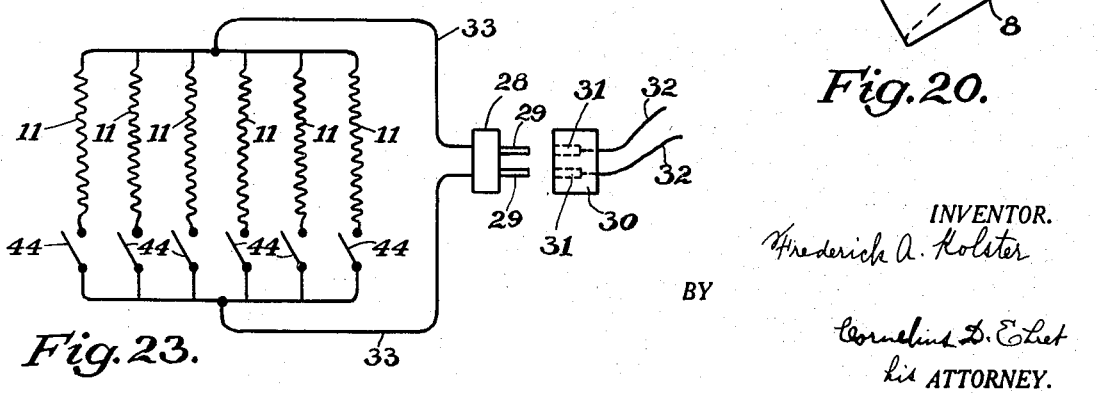

Patented Mar. 19, 1935

1,995,124

UNITED STATES PATENT OFFICE 1,995,124

REFRIGERATING SYSTEM

Frederick A. Kolster, New York, N. Y.

Application May 6, 1932, Serial No. 609,596

11 Claims. (Cl. 62—108.5)

My invention relates to refrigerating systems in general, and additionally and more particularly to household or domestic refrigerating systems.

In accordance with my invention, a tray, pan, or equivalent structure having one or more pockets in which water, food, or other material is to be frozen, is so mounted and associated with electrical heating means that, to remove the frozen material, the pan or tray is moved to such position that, after suitable thawing, the material is easily removed from or falls out of the pan or tray; more particularly, the arrangement is such that the electric heating circuit is not established until the pan or tray is moved from the refrigerating zone, or to a position to permit the frozen contents to be removed or fall from the tray or pan.

Further in accordance with my invention, the pan or tray, or a number of them, is mounted on a rack or carriage movable to and from refrigerating position; and more particularly when moved from refrigerating position to that for removing the frozen material, electric connection is made to a service supply from the wiring of the electric heating system comprised within the tray or pan in a unit with the aforesaid carriage or rack.

Further in accordance with my invention, each pan or tray is movable about a pivotal axis from normal refrigerating position, to position for removal of the frozen contents; more particularly the tray or pan is pivoted in a bearing or bearings carried by the aforesaid carriage or rack; more particularly each pan or tray has associated therewith contact structure movable with respect to relatively fixed contact structure, for controlling the electrical heating system; more particularly the switching mechanism is housed within a wall or other suitable portion of the carriage or rack; and more particularly the pan or tray is provided with a hollow pivot or shaft through which conductors connecting with its electrical heating system extend to the movable contact structure of the switch.

Further in accordance with my invention, a pan or tray is movable about its pivotal axis by an operating handle, with which latter or with any suitable portion of the pivoted system, cooperates a detent or equivalent means for retaining the tray or pan in either one or both of its significant positions.

My invention resides in a system, and features of structure, combination and arrangement, of the character hereinafter described and claimed.

For an illustration of some of the various forms my apparatus may take, and for an understanding of my system, reference is to be had to the accompanying drawings, in which:

Fig. 1 is a side elevational view, partly in vertical section, of refrigerating apparatus embodying my invention;

Fig. 2 is a front elevational view, partly in section, of the apparatus shown in Fig. 1;

Fig. 3 is a reproduction of a portion of Fig. 1, with the freezing trays and their carrier moved to position for removal of the ice blocks;

Fig. 4 is Fig. 3 on enlarged scale, with parts in section, and one of the trays in thawing and dumping position;

Fig. 5 is a front elevational view, partly in section, of the apparatus shown in Fig. 4;

Fig. 6 is a top plan view of the structure for establishing connection with the electric service supply, as further indicated in Figs. 1 to 5 inclusive.

Figs. 7 and 8 are, respectively, transverse and longitudinal sectional views of a tray element of the character illustrated in Figs. 1 to 6 inclusive;

Fig. 9 is a fragmentary top plan view of the structure shown in Fig. 8;

Figs. 10 and 11 are, respectively, transverse sectional and bottom plan views of a modified form of tray;

Fig. 12 is a transverse sectional view of a modified form of tray;

Fig. 13 is a horizontal sectional view, parts in plan, taken on the line 13—13 of Fig. 12;

Fig. 14 is a fragmentary front elevational view, partly in vertical section, illustrating a modification in which the movable carrier supports plurality of individually pivoted pans each comprising a plurality of rows of ice pockets;

Fig. 15 is a top plan view, partly in horizontal section, of the structure shown in Fig. 14;

Fig. 16 is a vertical sectional view, taken on the line 16—16 of Fig. 15;

Fig. 17 is an enlarged elevational view, partly in section, of the carriage and pan structure shown in Fig. 14, with one of the pans inverted;

Fig. 18 is a fragmentary sectional view, parts in elevation, showing the means for actuating each pivoted unit and its heater controlling switch, utilizable for each of the various forms of pivoted units herein illustrated;

Fig. 19 is an end elevational view, partly in section, of part of the structure shown in Fig. 18;

Fig. 20 is an illustration of the structure shown in Fig. 19, in thawing and dumping position, with addition of the switch contacts in elevation;

Fig. 21 is a fragmentary elevational view of the structure shown in Fig. 18, with the actuating member and movable switch contacts rotated to dumping and thawing position, with the stationary switch contacts in elevation;

Fig. 22 is an end elevation, partly in section, of part of the structure shown in Fig. 18;

Fig. 23 is a diagram of the circuits for the electric heaters.

Referring to Figs. 1 to 5 inclusive, 1 is a box, cabinet or housing of a household or domestic refrigerator of usual construction, provided with compartments, openwork shelves or gratings 2, and a refrigerating unit or element of any suitable type, here indicated by way of example as comprising the tubes or coils 3 through which the cooling or refrigerating medium is circulated.

Upon the members or bars 4 is hung and slidable the carriage or rack 5 having at its front the member 6 carrying a handle 7 by which the rack or carriage may be withdrawn from the refrigerating position, as within the unit 3, as indicated in Figs. 1 and 2, forwardly to position indicated Figs. 3, 4 and 5.

Pivotally mounted within the carriage or rack 5 is any suitable number of pans or trays 8 having any suitable number of pockets or compartments 9 for holding water or other material to be frozen. The trays or pans 8 and the walls of the pockets or compartments 9, are of any suitable material, preferably metal, such as aluminum, or a suitable alloy.

As indicated in Figs. 7, 8 and 9, between the bottoms of the pockets or compartments 9, and the bottom member 10 of the pan or tray 8 is disposed a resistance wire or coil 11, or equivalent electrical heating means of any suitable character and construction, and in any way suitably located, preferably in good heat conducting relation with respect to the walls of the pockets 9, particularly their bottoms, and electrically insulated preferably from all parts of the structure.

As indicated in Figs. 7, 8 and 9, neighboring pockets or compartments 9 are in communication with each other through passages 12, preferably of V or other equivalent shape, of greater dimensions at the top than at the bottom, whereby water or other fluid material may be introduced into any one of the pockets or compartments 9, and flow to equal level in all the others, preparatory to freezing, when the rack 5 is disposed in refrigerating position, for example within the coil structure 3.

Figs. 10 and 11 illustrate a modified construction of tray or pan 8 in which the neighboring pockets or compartments 9 are again in communication through passages 12. In this modification, the heating wire or element 11 is disposed in the bottom wall of the member 8, which in this case may be a casting; as indicated in Fig. 11 the electric heating resistor or equivalent means 11 may be disposed along the sides and ends of the bottom portion, and extend also between neighboring pockets 9.

In Figs. 12 and 13 is shown a further modification in which the tray or pan 8 is of sheet material and the pocket forming element is also of sheet material resting upon the top edge of the member 8. In this case the heating members or elements 11 are disposed within the casing 8 adjacent both the bottoms and the side walls of the pockets 9.

On one end of each tray member 8 may be attached or formed a suitable shaft or pivot 13, Figs. 4, 8, 11 and 13, mounted in bearings 14 carried by the rear vertical member of the rack or carriage 5. At the opposite or forward end of each tray or member 8 is provided a hollow shaft or pivot 15 mounted in bearing 16 carried by the rack member 6, as indicated in Figs. 4 and 18, or bearing upon the member 6 itself.

The member 6 may comprise, as illustrated in Figs. 4 and 18, a front plate or wall 17 and a rear plate or wall 18, spaced from each other to form a compartment in which may be suitably isolated or housed the switching structure for the heating element for each unit or pan 8, to prevent frosting or freezing of the switch. It will be understood, however, that in lieu of spaced walls 18 and 17 the member 6 may locally, adjacent each shaft or pivot 15, be chambered, or have attached thereto a chamber, for housing the switching mechanism.

As indicated in Figs. 4 and 18, the two connecting wires 19 and 20 extend from the heating resistor or element 11 through the hollow pivot or shaft 15 to a position, between the walls 17 and 18, where there is attached to and carried by the shaft 15, two switch terminals 21 and 22 to which the wires 19 and 20 are connected. These terminals are insulated from each other and from the shaft 15, as by mounting them upon an insulating element 23 carried by shaft 15. Suitably positioned within the space between the walls 17 and 18 are the relatively fixed contacts or clips 24 and 25, Figs. 20 and 21, with which engage respectively the terminals 21 and 22, upon rotation of the shaft 15 and the pan 8 by the operator's handle or knob 26 secured to the forward end of the shaft 15. The clips or contacts 24 and 25 are insulated from each other and carried by any suitable element 27 mounted as aforesaid in suitable position within the space between the walls 17 and 18 of the rack member 6, Carried by the rack or carriage 5, as by the member 6 thereof, is a plug 28, Figs. 1 to 5, having the two contact prongs 29, 29 which, on movement of the rack 5 from within the refrigerating coil 3 to its most forward position, as indicated in Figs. 3, 4 and 5, enter the receptacle 30 carried by a wall of the cabinet 1, on the inner side thereof. The receptacle 30 is provided with the usual two receptacle contacts or sockets 31, 31, Figs. 6 and 23. The contacts 31, 31 are connected by conductors 32, 32, Fig. 23, with a source of electric current such as the house wiring system.

From each pair of switch contacts or clips 24 and 25 for each pivoted refrigerant unit, extend conductors 33, 33 which connect respectively with the two prongs 29, 29 of the plug 28, whereby upon movement of the rack 5 to its forwardmost position, electrical connection is made with the service wires 32, 32 and the switches of each of the pivoted units or pans 8.

Associated with one of the pivots, as 15, of each pivotal unit or pan 8, is a generally circular member 34, Figs. 4, 18, and 22, secured to the pivot shaft 15, and having a circumferential depression or recess 35 in which is adapted to engage the detent or pin 36 biased downwardly by the spring 37 carried within the small housing 38 carried upon the front of the wall 17. The notch 35 is in such position that when the pin 36 engages therein it holds the tray or pan upright in refrigerating position. When, however, the handle 26 is rotated in suitable direction such that the member 8 takes the position for thawing and dumping, the pin or detent 36 will recede, against opposition of spring 37, from the recess 35. For the thawing and dumping position of the unit 8 there may be provided in the member 34 an additional notch 39 to restrain the unit 8 in thawing and dumping position. In Fig. 22 two sets of notches or recesses 39 are indicated, though only one will suffice, but since the units 8 may be arranged in groups such that they necessarily must be rotated in one direction only for thawing and dumping, the notch 39 may necessarily be on either the left or the right.

The operation is as follows:

Assuming the rack 5 in the refrigerating position indicated in Figs. 1 and 2, within the refrigerating coil 3, with the pockets 9 filled with water or material to be frozen, blocks of ice or frozen material are formed within the pockets. To remove the blocks of frozen material, a door of the cabinet 1 is opened, handle 7 grasped and the rack or carriage pulled fully forward upon the bars 4 until the plug contacts 29 enter the socket contacts 31 in the socket 30. The handle 26 of a unit or tray 8 is then grasped and rotated counterclockwise and clockwise, respectively, for the left and right-hand vertical array of units 8 as viewed in Figs. 2 and 5. Referring to the lowermost left-hand unit 8, Fig. 2, and to the units 8, in Figs. 19 and 20, the rotation to dumping position indicated in Figs. 5 and 20, causes the movable switch contacts 21 and 22 to engage the stationary switch clips or contacts 24 and 25, thereby completing connection between the service wires 32, through the unit switch, to the electric heating element or elements 11 of the unit, causing generation of heat which sufficiently thaws the blocks 9a of material within the pockets 9 to permit their removal or to cause them freely to leave the outwardly flaring or tapered pockets, and thereby be dumped into a dish or pan 40 in which they may be removed from the refrigerator. The frozen elements within the passages 12 and connecting the blocks 9a readily leave the passages 12 and break as the blocks are dumped. The unit 8 is then rotated back to its normal position, breaking the heater circuit at its individual switch. Thereupon it may again be filled with liquid or material to be frozen, and the rack 5 pushed backward into the coil 3 into refrigerating position, and in so doing the connection of the unit switches with the service supply 32 is broken by separation of the plug contacts 29 from the socket contacts 31.

The pivots 13 and 15 of each unit are preferably below its center vertically and preferably adjacent its bottom so that when turned for thawing and dumping it will more readily take that position. It will be understood, however, that the pivotal axis may be otherwise disposed as desired, and the unit held in thawing and dumping position or otherwise restrained as by detent 36. Particularly when the pivotal axis is below the center of gravity of the unit 8 with its contents, there may be provided clips, not shown, suitably engaging the upper edge or other suitable part of each unit 8 to maintain it in upright and freezing position.

In Fig. 14 there is shown a modification in which in the wide carriage or frame 41, of small vertical height, there are disposed side by side three individually pivoted units 42 which may be of the character indicated in Figs. 15 and 16 having three rows of pockets or receptacles 9, with five per row, and all suitably provided with electric heating elements 11. Each unit 42 is provided with pivots, switches, operating handles, detent, clip, etc., as hereinbefore described in connection with the units 8. In this modification, as before, the frame 41, carrying the pivoted units, slides upon the bars 4 to and from refrigerating position within the cooling coil 3. In Fig. 17 the frame or carriage 41 is shown partly broken away, illustrating one unit 42 in upright or refrigerating position, and the middle one inverted, in thawing and dumping position over the pan or dish 40 into which the ice blocks or other frozen material 43 falls.

Fig. 23 illustrates diagrammatically a switch 44, for the electrical heating unit or units for each pivoted unit, of any suitable construction and corresponding with the aforesaid switch having movable contacts 21 and 22 cooperating with relatively fixed contacts 24 and 25. Each switch 44 is closed when the unit with which it is associated is rotated to dumping position. Because of the employment of the plug and socket 28 and 30 current can be delivered to a heating unit or units through its individual switch 44 only when the rack 5 or 41 is pulled fully forward out of the refrigerating coil. The plug and socket render the system entirely electrically dead when the rack or carriage is within the refrigerating coil, and prevents generation of heat by any one or more of the heating units, when the rack is in refrigerating position, as might occcur upon the mischance that one of the units toppled over or otherwise should take the dumping position. Generation of heat under such mischance would materially reduce the refrigeration effected by the coil 3, preventing freezing of water or other material in the pockets 9 of the units 8 or 41, and also seriously lowering the temperature of the refrigerator as a whole.

The plug and socket, 28 and 30, constitute a switch common to all of the heating units of the several freezing units, in series with all of the individual switches for the freezing units.

In lieu of this type of switch 28, 30, there may be utilized a switch of well known type closed upon opening the door of that refrigerator compartment in which the rack 5 or 41 and the units 8 or 42 are disposed. For this purpose the switch may be located in the door jamb with its actuating element protruding into the path of the door.

It shall be understood that my invention is not limited to the energization of the heating elements when the trays or other containers of the frozen material is moved to dumping position. The heating element may be energized when the tray or container is in upright or freezing position, and the tray or container moved to dumping position with or without discontinuation of energization of the heating element. Due to suitable degree of thawing, the frozen material will drop out when the tray or container is in suitable position for that purpose. In brief, the several individual heater switches, indicated generically at 44 in Fig. 23, may be omitted, in which case when the rack 5 or 41 is drawn forwardly and the plug and socket 28 and 30 come into electrical connection, the heating units will be energized causing a thawing, and the trays or pans may then be moved to position to dump the frozen contents. Upon returning the rack within the refrigerating coil the heating elements are deenergized by separation of the plug 28 from the socket 30.

The receptacle 40, into which the blocks of ice or frozen material are discharged, may be removable from the refrigerator or may be fixed therein as upon the shelf, grating or equivalent member 2, Figs. 1 and 14; or as indicated by the dotted line 40a, Fig. 1, the receptacle 40 may occupy a lower position with its upper edge at or about the level of the shelf 2, and may in such case either be removable or fixed to the shelf 2.

What I claim is:

1. Refrigerating apparatus comprising a freezing unit, a container movable between discharge and freezing positions, a hollow pivotal support for said container, a heating unit associated with said container, a switch controlling said heater unit upon pivotal movement of said container, and electrical connecting means extending through said hollow pivotal support for connecting said heater unit with said switch.

2. The combination with a refrigerating unit, of a container, of supporting structure upon which said container is reciprocable to and from said refrigerating unit, means for pivotally supporting said container, an electrical heating unit included in a unit with said container, and means for establishing an electrical connection for said heating unit upon pivotal movement of said container with respect to said supporting structure.

3. The combination with a refrigerating unit, of a carriage, a plurality of containers supported on said carriage, supporting structure upon which said carriage is movable to and from said refrigerating unit, individual electrical heating means included in units with said containers, and means for establishing an electrical connection permitting selective energization of said heating means upon movement of said carriage away from said refrigerating unit.

4. Refrigerating apparatus comprising a refrigerating unit, a container, a carriage therefor, supporting structure upon which said carriage is movable to and from said refrigerating unit, heating means associated with said container, a switch for said heating means movable with said carriage, and means for establishing electrical connection with said switch upon movement of said carriage away from said refrigerating unit.

5. Refrigerating apparatus comprising a refrigerating unit, a container, a carriage therefor, supporting structure upon which said carriage is movable to and from said refrigerating unit, heating means associated with said container, a switch for said heating means movable with said carriage, and a housing movable with said carriage enclosing said switch.

6. The combination with a refrigerator housing, of a refrigerating unit therein, a container disposed within said unit, supporting structure upon which said container is reciprocable into and from the interior of said refrigerating unit, electrical heating means included in a unit with said container, and means for establishing connection for said heating means upon removal of said container from said unit.

7. In combination, a container for material to be frozen, electrical heating means included in a unit with said container, a pivotal support for said container, and means for holding said container in either freezing or discharge position.

8. A refrigerator comprising a housing, a refrigerating unit within said housing and spaced substantially from a wall thereof, a container normally disposed within said unit, supporting structure upon which said container is reciprocable from said unit to a position between said unit and said wall, electrical heating means included in a unit with said container, and circuit-controlling means for said heating means including contacts closed by movement of said container to said position.

9. A refrigerator comprising a housing, a refrigerating unit within said housing and spaced substantially from a wall thereof, a container normally disposed within said unit, supporting structure upon which said container is reciprocable from said unit to a position between said unit and said wall, electrical heating means included in a unit with said container, and means operable with said container in said position simultaneously to tilt the container and to energize said heating means.

10. A refrigerator comprising a housing, a refrigerating unit within said housing and spaced substantially from a wall thereof, a container normally disposed within said unit, supporting structure upon which said container is reciprocable from said unit to a position between said unit and said wall, heating means for freeing the contents of said container, and means permitting energization of said heating means when said container is moved to said position and preventing energization thereof when said unit is in its normal position.

11. A refrigerator comprising a housing, a refrigerating unit within said housing and spaced substantially from a wall thereof, containers normally disposed within said unit, supporting structure upon which said containers are reciprocable from said unit to a position between said unit and said wall, heating means individual to said containers, and means permitting selective energization of said heating means when said containers are in said position and preventing energization of any of said containers when disposed in said unit.

FREDERICK A. KOLSTER.